H. HILLEGASS.
PIPE REAMING MACHINE.
APPLICATION FILED MAY 19, 1914.

1,138,564.

Patented May 4, 1915.
2 SHEETS—SHEET 1.

Witnesses

Inventor
H. Hillegass,
By Victor J. Evans
Attorney

H. HILLEGASS.
PIPE REAMING MACHINE.
APPLICATION FILED MAY 19, 1914.
1,138,564.
Patented May 4, 1915.
2 SHEETS—SHEET 2.
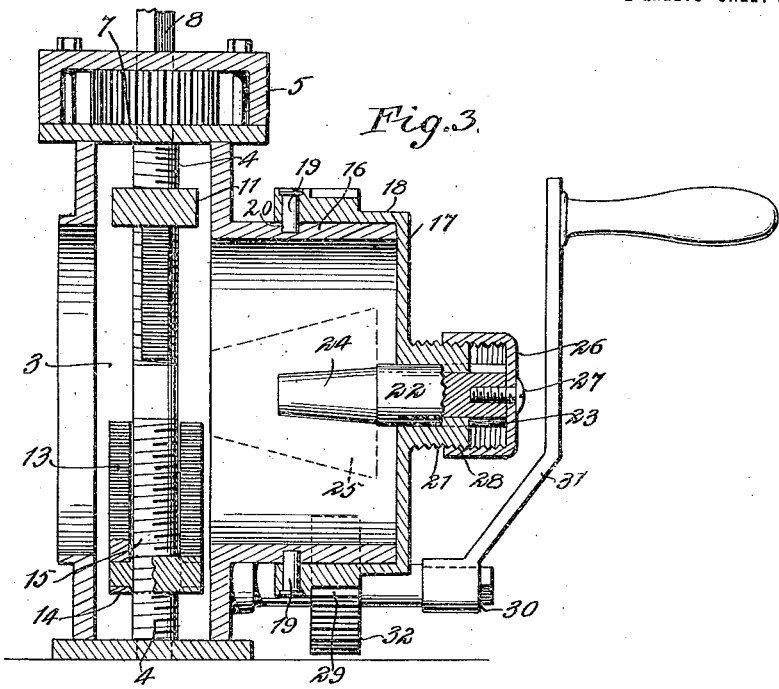
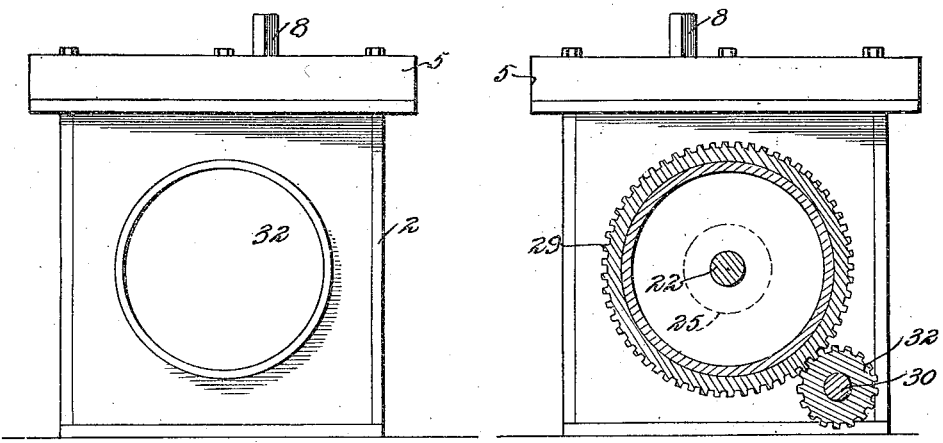
Witnesses
Inventor
H. Hillegass,
By Victor J. Evans
Attorney

UNITED STATES PATENT OFFICE.

HENRY HILLEGASS, OF HOUGHTON, MICHIGAN.

PIPE-REAMING MACHINE.

1,138,564.  Specification of Letters Patent.  Patented May 4, 1915.

Application filed May 19, 1914. Serial No. 839,576.

*To all whom it may concern:*

Be it known that I, HENRY HILLEGASS, a citizen of the United States, residing at Houghton, in the county of Houghton and State of Michigan, have invented new and useful Improvements in Pipe-Reaming Machines, of which the following is a specification.

The invention relates to a pipe reaming machine, in the use of which pipes of varying diameters may be quickly and properly reamed.

The main object of the present invention is the provision of a machine adapted to be operated by hand and capable of tightly securing the pipe section in position to permit coöperation of the appropriate reamer therewith.

The invention in the preferred form of details will be described in the following specification, reference being had particularly to the accompanying drawings, in which:—

Figure 1:
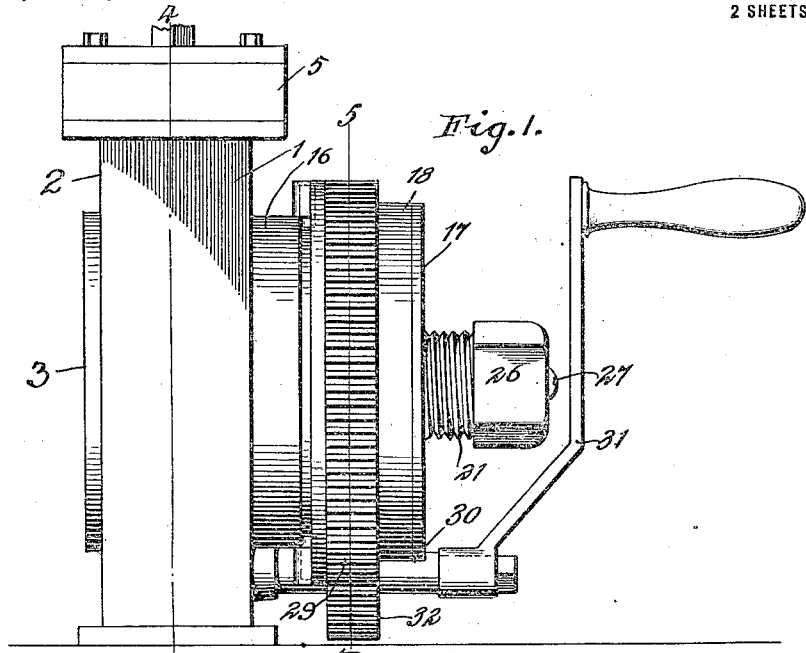
Figure 2:
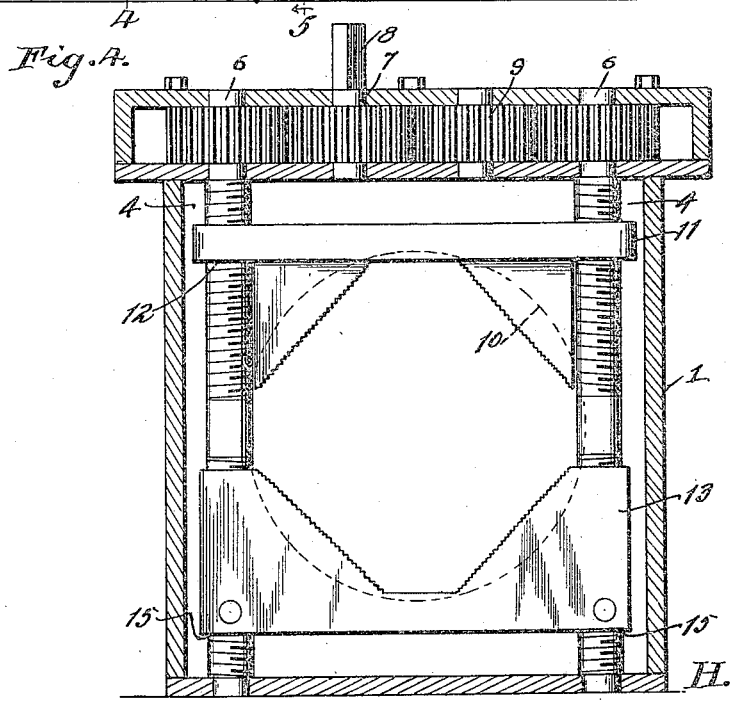

Figure 1 is a view in elevation of the improved machine. Fig. 2 is a front elevation of the same. Fig. 3 is a longitudinal central section. Fig. 4 is a transverse section on the line 4—4 of Fig. 1. Fig. 5 is a section on line 5—5 of Fig. 1.

Referring particularly to the accompanying drawings, the improved machine includes a frame 1 formed to provide a rectangular chuck receiving section 2 having a pipe receiving aperture 3 in one face thereof. In the opposing end of the chuck section 2 of the frame are mounted shafts 4 reversely threaded at their respective ends. One end of the chuck section 2 is provided with a case 5 into which the ends of the shafts 4 extend, and in the case on said shafts are fixed pinions 6. A drive pinion 7 is mounted in the case having projecting a stem or stub shaft 8 adapted to be operated by hand in any suitable manner, the pinion 7 meshing with one of the pinions 6 and operating from a pinion 6 and through an intermediate pinion 9, whereby the said pinions 6 are simultaneously and similarly operated. The shafts 4 are arranged in the chuck section of the frame so that a similar threaded portion of the respective shafts are opposite each other, and on the threaded portions of what may be said to be the upper parts of said shafts is mounted a chuck member involving a V-shaped jaw 10 projecting from a cross bar 11 terminating in threaded members 12 engaging the appropriate parts of the shafts 4. An opposing chuck member is arranged on the remaining portions of the shafts involving an angular jaw 13 projecting from a bar 14 terminating in members 15 having threaded coöperation with the shafts. From this construction it will be obvious that the chuck members may be caused to approach or recede from each other and by reason of the angular formation of the respective jaws may be caused to grip and securely hold a pipe section carrying in diameter from the maximum to the minimum dimension of the jaws.

The frame 1 includes a section 16 offset from the rear face of the chuck section 2, said section 16 being cylindrical and constituting a bearing section. An operating member is rotatably mounted on the bearing section including a plate 17 having an annular flange 18 to overlie and bear upon the outer surface of the section 16. The flange 18 is provided with removable rollers 19 seating in recesses 20 in the section 16, constituting a connection between the sections 16 and 17, and over an anti-friction bearing between the sections, though additional roller bearings are contemplated for such purpose if desired. The plate 17 is centrally formed with a rearwardly extending sleeve like member 21 constituting the hub, and a shaft 22 is mounted for sliding movement in the hub, having an ordinary sliding key connection 23 therewith. The inner end of the shaft 22 is of conical formation, as at 24, and removably secured upon the conical section of the section shaft is a reamer 25 which may be of any approved type. The shaft 22 extends beyond the hub 21 and is provided with a cap 26 connected through the medium of a screw 27 with the shaft, the cap being rotatable independently of the shaft but held against independent motion other than such rotation. The cap overlies the hub and the coöperating surfaces are threaded at 28, whereby the cap may be moved longitudinally of the hub in either direction and correspondingly move the shaft in the hub. The flange 18 is formed with a circular gear rack 29 constituting in effect a gear wheel, and a shaft 30 supported in the frame and rotatable through the medium of the conical handle 31. A pinion 32 is arranged upon the shaft to mesh with the gear 29, whereby the reamer is rotated.

From the above construction, it is obvious that the pipe section of any length or any diameter within the limits of the chuck members, may be secured in position in the chuck section of the frame, and properly reamed by the rotation of the handle 31. The reamer may be removably secured to the shaft portion 24 so that reamers of different sizes may be used by a particular reamer removed for resharpening and the chuck members may be adapted in any convenient manner to receive padding strips (not shown), whereby the original size may be reduced to accord with the particular pipe of comparatively small diameter.

What is claimed is:—

1. A reaming machine including a frame, chuck jaws mounted in a portion thereof, means for moving said chuck jaws toward and from each other, a reamer shaft mounted for sliding and rotating movement in the frame, a nut secured to said shaft and having threaded connection with a portion of the frame, a reamer mounted in the shaft, and means for rotating the shaft.

2. A reaming machine including a frame, opposing chuck jaws operable in one portion of the frame, a cylindrical frame extension, an operating member rotatably mounted in said extension, means for rotating said member, a hub projecting from the member, a reamer shaft mounted for longitudinal movement in the hub, and a cap having rotatable connection with the shaft and threaded connection with the hub.

3. A reaming machine comprising a frame, opposing chuck jaws operable in one portion of the frame, a cylindrical frame extension forming a bearing section, a plate disposed adjacent said bearing section, an annular flange on the plate overlying the bearing section, and adapted to rotate thereon, rollers carried by the flange adapted to be seated in recesses in the bearing section and forming a connection between the flange and the bearing section, means for rotating the plate and the annular flange, a hub projecting from the plate, a reamer shaft mounted for longitudinal movement in the hub, and a cap having threaded connection with the hub.

In testimony whereof I affix my signature in presence of two witnesses.

HENRY HILLEGASS.

Witnesses:
N. F. CHYNOWETH,
WILLIAM WARMINGTON.

Copies of this patent may be obtained for five cents each, by addressing the "Commissioner of Patents, Washington, D. C."